UNITED STATES PATENT OFFICE.

FRITZ HANSGIRG, OF GRÄTZ, STYRIA, AUSTRIA.

ART OF MANUFACTURING PERYLEN.

1,384,615.     Specification of Letters Patent.     Patented July 12, 1921.

No Drawing.     Application filed July 30, 1919. Serial No. 314,388.

*To all whom it may concern:*

Be it known that I, FRITZ HANSGIRG, residing at Grätz, in Styria, Austria, have invented new and useful Improvements in the Art of Manufacturing Perylen, for which I have filed applications in Austria Feb. 28, 1918, and in Germany March 9, 1918, of which the following is a specification.

The present synthetic methods of manufacturing perylen starting with $\alpha, \alpha$-dinaphtyl or its derivatives give but small yields of perylen.

I have found that a high yield of perylen may be obtained by treating the $\beta$-derivatives of naphthalene or of $\alpha, \alpha$-dinapthyl with halogenizing agents such as the halogen compounds of phosphorus, antimony, arsenic, aluminium and others, whereby $\beta$-substituted halogen derivatives of naphthalene or of $\alpha, \alpha$-dinaphtyl result, and these halogen derivatives are then transformed into perylen in a known manner by means of ring closing agents, such as chlorid of aluminium, or by means of pyrogene synthesis. It is advantageous to use in the process a reducing flux, such as phosphorous acid. The reaction may be carried out in such a way that starting with $\beta$-substituted derivatives of naphthalene or of $\alpha, \alpha$-dinaphtyl, the $\beta$-substituted halogen derivatives of this hydrocarbon are obtained and transformed in one operation with or without the isolation of the halogen derivatives. It is also possible to start directly with $\beta$-halogen-$\alpha, \alpha$-dinaphtyls which may be obtained in any known and convenient way.

The following give some examples of the methods of procedure:

(1) 1 kilogram $\beta$-dinaphthol is quickly heated to 500 degrees centigrade with 1 kilogram phosphorous acid while adding 1 kg. phosphorus trichlorid. The reaction takes place with heavy foaming while phosphin escapes and ignites as it passes off. When the formation of hydrogen phosphid gas ceases, the product of the reaction is fractionally distilled and thereby separated from the $\alpha, \alpha$ dinaphtyl oxid which also forms in the reaction. The yield is 60% of the starting material and is called technically pure perylen, and after crystallizing the technical product out of benzol or concentrated acetic acid, analysis shows that pure perylen is obtained, the yield being 80% of the technically pure perylen which was used.

(2) By starting with $\beta$-$\beta$-dichlor-$\alpha, \alpha$-dinaphtyl the reaction may be carried out with the mentioned flux or without it. If the reaction is carried out without using a flux then a smaller yield results.

(*a*). 1 kg. $\beta$-$\beta$-dichlor-$\alpha, \alpha$-dinaphtyl is heated to between 500° and 600° centigrade and the product of the reaction is treated as explained in example No. 1. The yield is 20% of the starting material in technically pure perylen.

(*b*). 1 kg. $\beta$-$\beta$-dichlor-$\alpha, \alpha$-dinaphtyl is heated with 1 kg. phosphorous acid to 500 degrees centigrade and the product of reaction is treated as in No. 1. A yield of 75% of the starting material is obtained in technically pure perylen.

(3) By carrying out the operation as described in example No. 1 and heating a mixture of the substances in the same proportions as given in that example, but terminating the heating before the evolution of hydrogen phosphid gas ceases, and then letting the product of reaction cool down without distilling it, it is possible—by boiling the cooled residue with sodium or caustic potash—to isolate a dark colored amorphous substance which can not be crystallized and therefore can not be identified. This substance is transformed into perylen by heating to high temperatures, or better, by heating with ring-closing agents such as aluminium chlorid. The yield is in the neighborhood of 25% when aluminium chlorid is used but it may be slightly better. In the examples given above instead of the chlorin compounds the corresponding compounds of the other halogens can be used and, in the place of phosphorous acid, the other acids of phosphorus.

Having now described my invention what I claim as new and ask to secure by Letters Patent is:—

1. A method of manufacturing perylen, consisting in adding a $\beta$-substituted derivative of a naphthalene nucleus to a halogenizing agent, and heating the product of the reaction.

2. A method of manufacturing perylen, consisting in adding a $\beta$-substituted derivative of a naphthalene nucleus to a halogenizing agent, and subjecting the product of the reaction to heat in the presence of a phosphorous acid to transform it into perylen.

3. A method of manufacturing perylen, consisting in adding a $\beta$-substituted derivative of a naphthalene nucleus to a halogenizing agent, and subjecting the product of the reaction to heat in the presence of a phosphorous acid and a ring-closing agent to transform it into perylen.

4. A method of manufacturing perylen, consisting in adding a β-substituted derivative of the α, α-dinaphtyl to a halogenizing agent, and heating the product of the reaction.

5. A method of manufacturing perylen, consisting in adding a β-substituted derivative of the α, α-dinaphtyl to a halogenizing agent, and heating the product of the reaction in the presence of a phosphorous acid to transform it into perylen.

6. A method of manufacturing perylen, consisting in adding a β-substituted derivative of the α, α-dinaphtyl to a halogenizing agent, heating the mixture, terminating the heating before the evolution of hydrogen phosphid gas ceases, isolating the product of the reaction, and heating said product in the presence of aluminum chlorid to transform it into perylen.

In testimony whereof I affix my signature in the presence of two subscribing witnesses.

Dr. FRITZ HANSGIRG.

Witnesses:
  Dr. DIEGO LASTRAS,
  LEOP. LAHN.